UNITED STATES PATENT OFFICE.

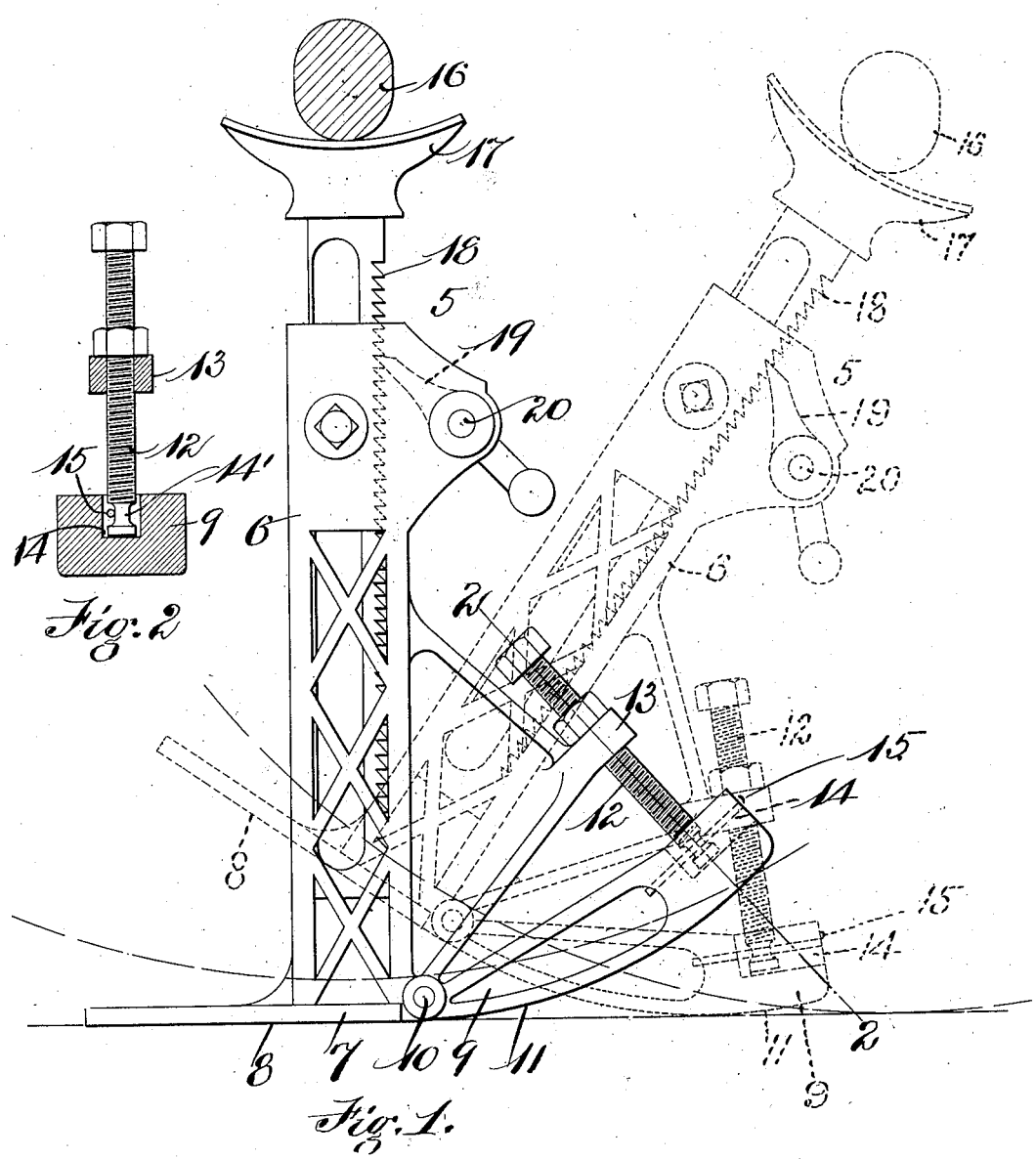

WILLIAM H. HAMPSON, OF CAMBRIDGE, MASSACHUSETTS.

VEHICLE-JACK.

No. 829,205.  Specification of Letters Patent.  Patented Aug. 21, 1906.

Application filed May 23, 1906. Serial No. 318,346.

*To all whom it may concern:*

Be it known that I, WILLIAM H. HAMPSON, a citizen of the United States, residing at Cambridge, in the county of Middlesex and State of Massachusetts, have invented new and useful Improvements in Vehicle-Jacks, of which the following is a specification.

This invention relates to an improved jack for vehicles, the same being an improvement upon a jack for vehicles for which I have made application for United States Letters Patent, Serial No. 289,950, filed December 2, 1905, "Vehicle-jack."

The object of this invention is to provide a cheap, simple, and easily-operated device which is particularly adapted for holding the body of an automobile or other power-vehicle raised, so that the tires of the wheels of said vehicle shall not rest upon the ground or floor when said vehicle is in the garage; and, further, the object of this invention is to provide a jack the base of which is divided into two parts, one adjustable relatively to the other for the purpose hereinafter described.

The invention consists in the combination and arrangement of parts set forth in the following specification and particularly pointed out in the claims thereof.

Referring to the drawings, Figure 1 is a side elevation of my improved vehicle-jack, showing a portion of the vehicle-wheel in broken lines raised from the ground and also showing the jack and wheel in fine dotted lines moved forward with the periphery of the wheel just coming into contact with the floor. Fig. 2 is a section, partly in elevation, taken on line 2 2, Fig. 1.

Like numerals refer to like parts throughout both views of the drawings.

In the drawings, 5 is a jack consisting of a standard 6, having a base 7, the bottom surface 8 of which is preferably straight. A foot 9 is pivoted at 10 to the standard 6, the bottom surface 11 of said foot being convexly curved, said foot being adjustable to different angles relatively to the standard 6 by means of a screw 12, which has screw-threaded engagement with an ear 13, forming a part of said standard. The lower end of the screw 12 projects into a slot 14, formed in the foot 9, said screw having an annular groove 14' formed in its periphery. A pin 15 is fastened to the foot 9 and extends transversely across the screw 12, lying within the annular groove 14', so that the screw 12 can be rotated toward the right or left and respectively lower or raise the foot 9 upon its pivot 10.

It will be noted that the bottom surface 11 performs in function a continuation of the bottom surface 8 of the standard 6 and that when the foot 9 is adjusted, by means of the screw 12, downwardly it will increase the distance of the curved bottom 11 from the center of the axle 16 of the vehicle which rests upon the holder 17, preferably concaved upon its top to receive said axle. The holder 17 is adjustable longitudinally of the standard 6 and is preferably rectangular in cross-section, extending downwardly into a correspondingly-shaped recess formed in the standard 6. The holder 17 has teeth 18 formed upon one side thereof, which engage a pawl 19, pivoted at 20 to the standard 6. The pawl 19 serves to lock the holder against downward motion relatively to said standard.

My improved jack is weighted at one side of the median vertical plane thereof, so that in its normal position the jack stands with the standard 6 at an angle to the floor upon which the jack rests, as shown in dotted lines, Fig. 1, so that when the different jacks are placed in position for the vehicle to be raised from the floor they will all stand at an angle, and when the vehicle is pushed against them the axles of said vehicle will contact with the concave portion of the upper end of the jack or of the holder 17, and by further pushing upon the vehicle the four jacks will rock upon their bases to the position shown in full lines, Fig. 1, and the vehicle be raised so that the tires will not touch the floor or ground. The weighting of the jack at one side of its median vertical plane is also disclosed in my application for Letters Patent hereinbefore referred to, the device of the present application having for its chief object the adjustability of the form of the bottom of the jack taken as a whole—that is, of the angle of the curved portion 9 of the foot to the straight portion 8 of the base 7. It will be seen and understood that by adjusting the foot 9 at different angles relatively to the standard 6 the jack in its normal position will stand with its median vertical plane at different angles to the floor upon which its rests, according to the position of said foot relatively to said standard.

The general manner of operation of the jack hereinbefore specifically described is as follows: Four jacks are used, two under each axle of the vehicle, and said jacks may be placed beneath said axles either by raising the axle with a jack and placing my improved jack thereunder, with the axle 16 located in the concave upper portion of the holder 17 and the jack in the position indicated in Fig. 1 in full lines with the flat bottom surface 8 resting upon the ground or floor, or the jacks may be placed beneath the axle, as shown in dotted lines, Fig. 1, and the vehicle pushed toward the left until the jack assumes the position shown in full lines in said figure, rocking upon the curved bottom surface of the foot 9 from one position to the other until finally it assumes the position show in Fig. 1 in full lines. When four jacks are used in the manner last described, the vehicle may be raised, together with the wheels thereof, from the ground or floor, so that the tires do not rest upon the floor. When it is desired to use the vehicle, the same is pushed forward, and the different jacks will rock from the position illustrated in full lines, Fig. 1, to that shown in dotted lines until the periphery of the tire of each wheel rests upon the floor. The jacks are then removed and the vehicle is ready for use.

Having thus described my invention, what I claim, and desire by Letters Patent to secure, is—

1. A vehicle-jack comprising a standard adapted to support a vehicle, a foot pivoted to said standard having a convexly-curved bottom surface forming a continuation of the bottom surface of said standard, and means to adjust said foot to different angles relatively to said standard.

2. A vehicle-jack comprising a standard adapted to support a vehicle, a foot pivoted to said standard having a convexly-curved bottom surface forming a continuation of the bottom surface of said standard, and a screw connecting said standard and foot and having screw-threaded engagement with one of said parts, whereby said foot may be adjusted to different angles relatively to said standard.

3. A vehicle-jack comprising a standard adapted to support a vehicle, a foot pivoted to said standard having a convexly-curved bottom surface forming a continuation of the bottom surface of said standard, and a screw having screw-threaded engagement with said standard and rotatably connected to said foot, whereby said foot may be adjusted to different angles relatively to said standard.

4. A vehicle-jack comprising a standard adapted to support a vehicle, a foot pivoted to said standard having a convexly-curved bottom surface forming a continuation of the bottom surface of said standard, a screw having screw-threaded connection with said standard, the lower end of said screw projecting into a slot provided in said foot, and a pin fast to said foot and projecting into an annular groove in said screw, whereby said screw is rotatably connected to said foot and said foot may be adjusted to different angles relatively to said standard.

5. A vehicle-jack comprising a standard adapted to support a vehicle, a foot pivoted to said standard having a convexly-curved bottom surface forming a continuation of the bottom surface of said standard, and means to adjust said foot to different angles relatively to said standard, said jack being weighted at one side of its median vertical plane, whereby the same stands normally in position to receive the axle of said vehicle when the wheels thereof are in contact with the floor.

In testimony whereof I have hereunto set my hand in presence of two subscribing witnesses.

WILLIAM H. HAMPSON.

Witnesses:
 CHARLES S. GOODING,
 ANNIE J. DAILEY.